(12) United States Patent
Landsberg et al.

(10) Patent No.: US 11,483,966 B2
(45) Date of Patent: Nov. 1, 2022

(54) CONVEYING DEVICE

(71) Applicant: Grimme Landmaschinenfabrik GmbH & Co. KG, Damme (DE)

(72) Inventors: Jörg Landsberg, Damme (DE); Stefan Redel, Damme (DE); Hendrik Komossa, Lüdinghausen (DE); Heinrich Schleiner, Osnabrück (DE)

(73) Assignee: Grimme Landmaschinenfabrik GmbH & Co. KG

( * ) Notice: Subject to any disclaimer, the term of this patent is extended or adjusted under 35 U.S.C. 154(b) by 240 days.

(21) Appl. No.: 16/757,494

(22) PCT Filed: Oct. 12, 2018

(86) PCT No.: PCT/EP2018/077947
§ 371 (c)(1),
(2) Date: Apr. 20, 2020

(87) PCT Pub. No.: WO2019/076772
PCT Pub. Date: Apr. 25, 2019

(65) Prior Publication Data
US 2020/0245547 A1    Aug. 6, 2020

(30) Foreign Application Priority Data

Oct. 20, 2017 (DE) .......................... 102017124616.9

(51) Int. Cl.
*A01D 17/10* (2006.01)
*B65G 15/52* (2006.01)

(52) U.S. Cl.
CPC .............. *A01D 17/10* (2013.01); *B65G 15/52* (2013.01); *A01D 2017/103* (2013.01); *A01D 2017/106* (2013.01); *B65G 2201/0211* (2013.01)

(58) Field of Classification Search
CPC .............. A01D 17/10; A01D 2017/103; A01D 2017/106; B65G 15/52; B65G 2201/0211
See application file for complete search history.

(56) References Cited

U.S. PATENT DOCUMENTS 1,199,703 A    9/1916  Kendall
3,788,453 A  *  1/1974 Varney ..................... A23N 3/00
                                                      226/14

(Continued)

FOREIGN PATENT DOCUMENTS

DE    3529464 C1   10/1986
DE   20116382 U1    2/2003

(Continued)

*Primary Examiner* — Mark A Deuble
(74) *Attorney, Agent, or Firm* — Husch Blackwell LLP

(57) ABSTRACT

A conveying device is provided for an upwardly oriented, in particular vertical, conveyance of turnips or other root crops in harvesting machines. A conveyor belt with at least two lateral conveyor belt portions is moved in a conveying direction during operation. Between the conveyor belt portions is defined a particularly planar conveyor belt surface, and at least one carrier unit which projects from the conveyor belt surface and is supported by the conveyor belt. The carrier unit delimits a receiving space extending on both sides of the conveyor belt surface. The part of the receiving space which is arranged on the side of the conveyor belt surface which is opposite the carrier unit is formed by at least one detachably fastened pocket module and harvesting machines for turnips or other root crops having a conveying device.

20 Claims, 13 Drawing Sheets

(56) References Cited

U.S. PATENT DOCUMENTS

| | | | | | |
|---|---|---|---|---|---|
| 4,019,625 | A | * | 4/1977 | Wiese | B65G 17/36 198/708 |
| 4,501,350 | A | * | 2/1985 | Muller | B65B 25/046 198/477.1 |
| 6,467,610 | B1 | * | 10/2002 | MacLachlan | B65G 17/32 198/853 |
| 7,182,202 | B2 | * | 2/2007 | Kalverkamp | B65G 17/02 198/848 |
| 7,789,166 | B2 | * | 9/2010 | Wallace | A01D 33/10 171/138 |
| 8,827,070 | B2 | * | 9/2014 | Kalverkamp | B65G 15/52 198/716 |
| 2006/0266622 | A1 | | 11/2006 | Kalverkamp | |

FOREIGN PATENT DOCUMENTS

| | | |
|---|---|---|
| DE | 202005008426 U1 | 9/2005 |
| DE | 102004044303 A1 | 3/2006 |
| EP | 2420125 A1 | 2/2012 |
| EP | 3797572 A1 * | 3/2021 |

* cited by examiner

CONVEYING DEVICE

CROSS-REFERENCE

This application claims priority to PCT Application No. PCT/EP2018/077947, filed Oct. 12, 2018, which itself claims priority to German Application No. 10 2017 124616.9, filed Oct. 20, 2017, the entirety of both of which are hereby incorporated by reference.

FIELD OF THE INVENTION

The invention relates to a conveying device for an upwardly oriented, in particular vertical, conveyance of turnips or other root crops in harvesting machines. The conveying device comprises a conveyor belt with at least two lateral conveyor belt portions moved in a conveying direction during operation. Between them, the conveyor belt portions define a particularly planar conveyor belt surface. The conveying device comprises at least one carrier unit which projects from the conveyor belt surface on one side and is supported by the conveyor belt, which carrier unit delimits a receiving space extending on both sides of the conveyor belt surface.

BACKGROUND

Conveying devices of this kind are used in self-driving or towed harvesting machine, for example, particularly for turnips or potatoes. The conveyor belt in this case is rotating during operation. The conveying device receives root crops during a rotation and delivers them again to a more elevated position. The conveying device is driven during use in the harvesting machine and is guided or diverted during rotation.

The carrier unit is used to support or carry the root crops during the upwardly oriented conveyance. During this, the root crops are located in the receiving space which extends from the carrier unit through the imaginary or virtual conveyor belt surface on the opposite side thereof. The conveyor belt surface therefore corresponds to a sectional surface which is formed between conveyor belt portions configured as belt portions, for example. The carrier unit projects from the conveyor belt surface on at least one side; its extension direction points away from the conveyor belt surface. On the opposite side, the receiving space is customarily formed by part of the conveyor belt, for example by bent screening bars. A lateral, continuous tie designed as a belt, for example, of a conveying device is divided into a plurality of conveyor belt portions following one another.

Conveying devices of this kind are configured in practice as ring elevators, for example. In this case, the conveyor belt rotates about a different harvesting machine part, wherein the carrier unit projects from the conveyor belt surface on the inside. During a rotation, the receiving space receives root crops and conveys them upwards. The conveying device is configured in such a manner that it reaches it maximum conveying capacity with root crops of a particular kind and size.

BRIEF SUMMARY

The problem addressed by the present invention is that of providing a conveying device which can be better adapted to different applications and also a corresponding harvesting machine.

According to the invention, the problem is solved by an actuating device of the aforementioned kind in which the part of the receiving space which is arranged on the side of the conveyor belt surface which is opposite the carrier unit is formed by at least one detachably fastened pocket module.

The conveyor belt portions define the virtual conveyor belt surface, insofar as they extend at least transversely to the conveying direction in a straight line through both conveyor belt portions. The conveyor belt surface extends along the conveying direction of the conveying device and is, in particular, at least partially planar. The conveyor belt surface divides a space into two sides which in turn define spaces. The receiving space is intersected by the conveyor belt surface. The part of the receiving space on one side is sectionally delimited by the carrier unit. The other part of the receiving space which is arranged on the second side of the conveyor belt surface is formed by the pocket module. In particular, the lateral ties of a of a conveying device each form a plurality of conveyor belt portions following one another in the rotating direction.

The part of the receiving space which is located on the second side of the conveyor belt surface, on which the pocket module is also arranged, preferably has a pocket-shaped character. The pocket shape is achieved in that the single opening of this part of the receiving space lies in the conveyor belt surface. Alternatively, this part of the receiving space may also be open in a direction facing away from the carrier unit. The pocket module delimits the receiving space at least in a direction perpendicular to the conveyor belt surface. The receiving space in this case is delimited both by the carrier unit and also by the pocket module, insofar as the root crops cannot pass through the pocket module or though the carrier unit.

The conveyor belt portions which lie in the conveyor belt surface or span said surface transmit a tensile force which is applied to the conveyor belt directly or indirectly by a drive unit of the harvesting machine. The conveyor belt portions are preferably arranged in such a manner that the receiving space extends between them. The conveyor belt portions are, moreover, preferably configured as parts of rotating, separate belts or strips, but may also be integral in an alternative preferred embodiment of the conveying device according to the invention and, in particular, be connected to one another in the region of the carrier unit.

The carrier unit is supported on the conveyor belt in the same way as the pocket module, i.e. directly or indirectly fastened thereto. It carries the root crops at least partially during conveyance and prevents them from rolling down during conveyance. The carrier unit preferably comprises a lip or a plurality of fingers or brackets which project from the conveyor belt surface particularly substantially at right angles particularly preferably, the end of the carrier unit facing away from the conveyor belt surface is formed running at least proportionally in the conveying direction, in order to achieve an extended enclosure of the receiving space to hold a plurality of root crops. In addition, the carrier unit has, in particular, an extension in the second side of the conveyor belt surface; the carrier unit in this case preferably has a main extension starting from the conveyor belt surface in a direction facing away from the pocket module.

Both the carrier unit and the pocket module are arranged during operation rotating with the conveyor belt in the harvesting machine. The conveyor belt in this case is moved during operation in a conveying direction and rotates during this. The conveying direction varies cyclically during operation, wherein the conveying device preferably has a portion in which the conveying direction is temporarily constant during operation and particularly preferably is arranged vertically relative to a floor on which the harvesting machine stands or travels, in order to overcome a height difference as efficiently as possible.

The pocket module delimits the receiving space at least laterally in a direction arranged perpendicularly to the conveyor belt surface and therefore has a significant extension both in the conveying direction and also transversely thereto in a direction parallel to the conveyor belt surface. The pocket module is preferably fastened from the outside to the conveyor belt or to the carrier unit and is detachable therefrom. The pocket module preferably does not intersect the conveyor belt surface and is detached from the conveyor belt during dismantling in a direction facing away from the conveyor belt surface. The pocket module is detachable from the conveying device in modular form and replaceable, i.e. can be separated as a whole from the rest of the conveying device and detachably fixed thereto.

The conveying device according to the invention may be provided with a plurality of receiving spaces spaced apart from one another in the conveying direction to form a ring elevator. In this case, the carrier units are inwardly oriented into the internal space spanned by the conveyor belt.

The advantage of the detachably fixed pocket module is the possibility of it being replaced simply and quickly. In this way, the size of the receiving spaces and also the shape of the delimitation thereof can easily be varied, as a result of which both the conveying device and the harvesting machine can be adapted to different conditions. In particular, the possible variation of pocket modules means that the conveying capacity can be maximized for different conditions, such as different vegetables being conveyed, for example. This means that the conveying device can be used particularly flexibly with greater conveying capacities under different usage conditions. Moreover, the at least one detachably fastened pocket module means that the handling capability both of the conveying device and also of any machine parts enclosed by the conveying device in a harvesting machine, in particular the maintenance and repair thereof, is substantially simplified by improved accessibility when the pocket module is detached.

The conveying device preferably has at least two pocket modules connected to one another in the conveying direction. In this way, multiple receiving spaces of different circumferential portions of the conveying device are in particular formed by multiple pocket modules. Alternatively, at least one receiving space is formed by multiple pocket modules. Each receiving space is preferably formed by only one pocket module on the side of the conveyor belt surface opposite to the carrier unit. Pocket modules connected to one another are either in direct contact or spaced slightly apart from one another. The spacing in this case is at most as great as that of two carrier units adjacent to one another in the conveying direction. The plurality of pocket modules means that their replacement is substantially simplified by comparison with the replacement of a correspondingly larger pocket module. In particular, the time required for replacement can thereby be reduced by comparison with the time required to replace the entire conveying device according to the prior art and the conveying and harvesting capacity of the harvesting machine can be increased as a result of shorter set-up times.

Each pocket module preferably co-forms at most six, in particular at most three, receiving spaces. In this case, these receiving spaces are adjacent receiving spaces in the conveying direction. Limiting the size of the pocket modules in the conveying direction means that they can be handled particularly easily and replaced correspondingly more quickly, as a result of which the operating time and therefore the total conveying capacity of the conveying device is increased.

Pocket modules connected to one another are advantageously in direct contact and form a chain of pocket modules rotating with the conveyor belt which has no gaps along the conveying direction. This means that all receiving spaces can be particularly reliably delimited, thereby ensuring a high conveying capacity.

Particularly preferably, each pocket module forms exactly one receiving space. This means that the sizes of the pocket modules can be further reduced when there is an optimum receiving space size and they are particularly manageable. This means that the time required for a replacement can in turn be reduced and the conveying capacity maximized.

In an advantageous embodiment of the invention, two pocket modules which are connected to one another in the conveying direction are each detachably fixed by at least one fastening device. By means of the fastening device, the pocket modules connected to one another are directly or indirectly supported by at least one of the conveyor belt sections. The fastening device is in contact with the pocket modules, either in multiple different regions or in only one coherent region. Two fastening devices are preferably located in the region of a conveyor belt segment, which fastening devices each fix both pocket modules connected to one another. Particularly preferably, one fastening device is located in the region of the one lateral conveyor belt portion and the other fastening device in the region of the other lateral conveyor belt portion. The pocket modules which are connected to one another are either directly adjacent to one another or they are fixed at a distance from one another to the at least one fastening device. The advantage of using a fastening device to fix two pocket modules is that the time needed to fix the pocket modules to the conveying device can thereby be reduced to such an extent that by operating a fastening device two pocket modules can be simultaneously fixed at least sectionally. Multiple fastening devices which are at a level or are adjacent to one another in the conveying direction are preferably operated via a lever which has to be thrown, for example. In this way, the amount of work required in order to fasten the pocket modules to the conveying device is further reduced and the operating time is thereby increased by comparison with the set-up time and conveying capacity is improved.

The pocket module is preferably fixed to the carrier unit, in particular, at least in the region of said carrier unit, by at least one fastening device. In this case, the carrier unit and the fastening device are preferably located at least partially in the conveying direction at a level which means that the fastening device and the carrier unit overlap at least partially in plan view At least two fastening devices spaced apart from one another in the lateral direction are preferably fixed to the carrier unit. In this case, the carrier unit may act as part of the fastening device. Alternatively, the fastening device is fixed to the conveyor belt sections at a corresponding height. The fact that the pocket module is fixed in this region means that the receiving space can be particularly advantageously configured. In particular, a pocket-shaped protuberance on the pocket module in this case has a fixing point in the region of the carrier unit, in that the pocket module is fixed close to, or in, the conveyor belt surface, from where a bulbous protuberance can then be formed on the carrier unit, as a result of which a particularly voluminous receiving space can be formed. A further advantage is that the fixing of the pocket module to the carrier unit, which has a greater rigidity than the conveyor belt sections, is easier and therefore quicker than to other parts of the conveying device. Another advantage of having the fixing in this region is that root crops can thereby be particularly effectively prevented from being able to escape from the receiving space through a gap between the carrier unit and the pocket module during the upwards conveyance.

The pocket module is preferably fixed exclusively in the region of the carrier unit by at least one fastening device. The region of the carrier unit also extends in an alternative preferred embodiment to a conveyor belt segment which is adjacent in the conveying direction and which has a maximum length that corresponds to one-third of the distance between two carrier units. The fact that the pocket module is not fixed in the region between the carrier units means that it can be optimally here, i.e. at a continuous greater distance from the conveyor belt surface than in the fixing point, this is, in particular, not interrupted by further fastening devices between the carrier units, as a result of which the receiving space would be limited by an interruption in the desired bulbous protuberance of the pocket module.

Alternatively, the pocket module is preferably fixed at least in the region of a further carrier unit which is adjacent in the conveying direction or between the region of the carrier unit and the region of the further carrier unit by at least one fastening device. This fixing to a portion of the conveying device which differs from the regions of the carrier units means that a particularly stable fixing of the pocket module is achieved, wherein the number of fixing points is increased or smaller dimensions of the pocket modules are facilitated. Moreover, the passage of root crops through a gap between the pocket module and a conveyor belt portion can thereby be avoided. The pocket module in this case extends at least from the point of fixing to the region of the carrier unit. The pocket module is preferably fixed in addition by at least one fastening device in the region of the carrier unit. In this way, the stability of the pocket module is further increased, as a result of which the conveying capacity is improved.

In an advantageous embodiment of the invention, the fastening device comprises at least one form element which at least partially simulates a shape of the receiving portion and is adjacent to the pocket module. During fixing, this form element is directly adjacent to the pocket module. The form element partially simulates the shape of the pocket module as part of the conveying device and thereby optimizes the shape of the receiving space in the region of the part adjacent to the pocket module. By optimizing the shape of the receiving space, the conveying capacity of the conveying device and therefore the conveying performance are increased. Moreover, the fastening device can be adapted by the form element to differently shaped pocket modules and thereby facilitates adjustment of the entire conveying device.

The pocket module is preferably arranged by the form element in such a manner that the part of the receiving space which is delimited by the pocket module and by the conveyor belt surface in a longitudinal section of the longitudinal direction of the conveying device is in the shape of a halved droplet, the underside of which is adjacent to the region of the carrier unit. In this case, the pocket module is fastened in, or close to, the conveyor belt surface in the region of the carrier unit and in the region of the other carrier unit which is adjacent in the conveying direction and forms a bulbous part of the receiving space facing away from the conveyor belt surface.

The fastening device preferably fixes two pocket modules which are connected to one another onto one another in a clamping manner and in respect of the carrier unit. In this embodiment, pocket modules connected to one another overlap in the conveying direction, wherein the fastening device is located in the overlapping region. The pocket modules are preferably clamped transversely to the conveying direction, in particular by at least one form element. The fastening device in this case is fixed to the carrier unit. Clamping is preferably achieved by at least two elements connected to one another by a thread, a lever which needs to be thrown or alternative embodiments of the fastening device. The advantage of clamping overlapping pocket modules is the particularly simple and reliable form of the fastening thereof, as a result of which the time required to replace pocket modules is shortened and the long-term efficiency of the conveying device can be increased.

The pocket module preferably has at least two fastening regions which are adjacent in the conveying direction and fastening regions which each adjoin a fastening device. The distance thereof as part of the conveying device is smaller than the length of the pocket module between the fastening regions in an unrolled state separate from the conveying device. The pocket module in this case is bendable at least about a bending axis orthogonal to the conveying direction and forms a protuberance on the conveying device during operation, as a result of which the distance between the pocket module and the conveyor belt surface at the receiving space varies. It is thereby achieved that the pocket module is tension-relieved in relation to the conveyor belt portions during rotation and its shape is influenced by the distance of the fastening devices adjacent thereto and also the weight of the pocket module and any root crops being conveyed. It follows from this that during a deviation of the conveyor belt, the pocket module which is fixed spaced apart from the conveyor belt surface, is temporarily lengthened or shortened in the conveying direction, however the pocket module is never loaded by forces applied to the conveyor belt portions by the harvesting machine. In this way, the reliability of the pocket module and therefore the conveying capacity of the conveying device is increased and, at the same time, the tension-free and therefore simplified assembly of the pocket module is facilitated, which allows a proportionate increase in operating time.

Particularly preferably, the pocket module has two pocket ties arranged in parallel which are connected to one another by at least one particularly metallic or plastic wall element. The pocket ties in this case run substantially in the conveying direction and adjacent to a conveyor belt portion in each case and are deformable. The wall element is fixed to both pocket ties and delimits the receiving space. This design means that the pocket module is particularly stable and an increased conveying capacity can be achieved. Particularly preferably, the wall element is metallic, as a result of which a maximum stability is achieved and the distance between the pocket ties is kept constant. Alternatively, the wall element is preferably made of plastic, which means that a particularly lightweight pocket module can be realized which makes it easier to assemble. A wall element made of plastic is particularly a fibre-glass-reinforced composite component. Relieving the tension on the pocket module means that there is no substantial change in the mutual distances between the wall elements during a rotation. This means that no root crops can get jammed or squashed between the wall elements, which expands the field of application of the harvesting machine to crops which require particularly careful handling too. By using identical pocket ties for pocket modules with differently sized recesses delimited by the wall element, the replacement of pocket modules can be simplified and standardized.

The pocket module preferably comprises a plurality of wall elements which are configured as struts which are particularly equidistant and run transversely to the conveying direction. The pocket ties in this case are connected to one another by a plurality of struts extending transversely to the main extension direction of the pocket ties, which struts are preferably at an identical distance from their adjacent struts in each case. According to a further inventive embodiment, the distance between the struts may vary in the conveying direction, in particular such that starting from the carrier unit, the struts are at least partially at an increasing distance from one another. The pocket module is preferably in the form of a screen belt segment which is mounted on the conveyor belt in such a manner that part of the pocket module sags or forms a bulbous or S-shaped cross sect ion, since its extension in the conveying direction in the unrolled state is greater than in the mounted state. A particularly reliable delimitation of the receiving space is achieved by means of this embodiment, wherein along a complete rotation of the conveyor belt, at the end of which each conveyor belt segment is located at the same place as prior to the rotation, the struts retain the same distance from one another in the harvesting machine, since the pocket modules only have to withstand negligible tensile loads. The plurality of struts means that the pocket module is furthermore particularly simple to handle and therefore easier to assemble and dismantle.

By means of the wall elements, a cleaning effect is achieved, particularly during the delivery of root crops and when they are added to the conveying device. The fact that root crops move relative to one another and rub against the boundary of the receiving space means that dirt is removed from them and is able to leave the receiving space through the pocket module. Gravity means that this is particularly the case when the receiving space is oriented in such a manner during rotation that it is downwardly delimited by the pocket module on a side facing the floor 100031*j* For optimum adjustment to different harvesting conditions and root crops, pocket modules of the design described are used, wherein these can be replaced in a modular manner for those with different distances between the wall elements or a different elasticity of the pocket ties.

In an alternative advantageous embodiment of the pocket module, this is configured as a dimensionally stable basket. Said basket is likewise tension-relieved and to this extent dimensionally stable when the basket interior which spans the pocket module varies by a maximum factor of 2 during a rotation of the conveying device. In particular, the shape is largely independent of the filling level, i.e. of the number of root crops held by the pocket module and of the spatial orientation of the pocket module which varies during the rotation of the conveyor belt. By using a basket of this kind, the size of the receiving space can be kept largely constant during rotation of the conveying device, as a result of which the conveying capacity is maximized. The dimensional stability of the pocket modules in turn makes them easier to handle.

The pocket module is preferably made of plastic. This means that the weight of the pocket module can be reduced as far as possible, which means that assembly and dismantling are simplified. This means that the conveying device can be used particularly flexibly.

The pocket module is particularly preferably integral in design. With this design, there are no risk-prone fixing parts in the pocket module, particularly between different materials, which means that the stability of the pocket module is endangered.

Furthermore, an integral pocket module makes it significantly easier to replace.

In an advantageous embodiment of the invention, the conveyor belt comprises at least two strut elements arranged on the conveyor belt portions and assigned to the carrier unit or to the carrier units, in particular twice as many as carrier units. These strut elements are fastened to both conveyor belt portions, particularly using rivets, and run transversely to the conveying direction. These strut elements are arranged as a pair and each pair is assigned to a carrier unit and supports this. By using two separate strut elements, the conveyor belt can withstand a torque supported by the carrier unit particularly reliably. The carrier unit is arranged on both strut elements for this purpose. The increased reliability of the support brings about an increased conveying capacity overall. Exactly two of the strut elements assigned to the carrier unit are advantageous since the plurality of connections to the conveyor belt portions associated with a plurality of strut elements affects the tensile strength thereof, but two strut elements ensure a reliable torque support for the carrier units. A further disadvantage of a plurality of connections between the strut elements and the conveyor belt portions, which are particularly configured as rivet connections, is that a drive element which applies force to at least one conveyor belt portion suffers greater wear due to the rivet connections and metallic contact therewith, which is minimized by only two strut elements per carrier unit. Consequently, this minimum number of strut elements produces a maximum stability of the conveying device. This stability thereby simplifies the replacement of the pocket module in that the rest of the conveying device deviates only minimally during the fixing of the pocket module and therefore makes assembly easier.

The problem is further solved by a harvesting machine for turnips or similar root crops which comprises at least one conveying device according to the invention. The conveying device according to the invention is preferably used as a ring elevator. In this case, the ring elevator has a plurality of receiving spaces in which the root crops are displaced from a lower region of the harvesting machine into an upper region. The ring elevator in this case rotates about further parts of the harvesting machine and is adjacent to the sides of the harvesting machine, particularly to the surrounding area. The conveying device makes the harvesting machine flexible to use and facilitates a higher performance overall. Moreover, in the harvesting machine according to the invention the advantages of the conveying device described above and below come into play.

During operation of the conveying device, the receiving space preferably adjoins at least one guide element extending in the conveying direction and, in particular, not moving in the conveying direction, at least sectionally. This guide element is situated at least sectionally between one of the conveyor belt portions and the pocket module and thereby delimits the receiving space laterally. In particular, the guide element is configured as an elongate metal sheet which delimits a plurality of adjacent receiving spaces. The advantage of using a guide element of this kind is the reliable avoidance of an accidental loss of root crops from the receiving space through a gap between the pocket module and the conveyor belt. Consequently, the efficiency of the harvesting machine can be increased by the guide element. Because part of the delimitation of the receiving space arranged on the second side is formed by the guide element, the at least one pocket module may be smaller with a constant receiving space size. A smaller pocket module is in turn easier to handle.

The guide element or a guide mechanism formed by multiple guide elements preferably has a U-shaped cross section, through the interior of which the carrier units run at least partially in the conveying direction. In this case, the receiving space is delimited laterally and in a boundary area facing away from the pocket module at least partially during a rotation of the conveying device by the guide device or guide element which is fixed relative to the harvesting machine. In this way, the conveying capacity of the conveying device is increased during vertical conveyance and the field of application of the harvesting machine is thereby increased.

Particularly preferably, the guide element can be transferred from a guide position into a transport position. It is located in the guide position during operation of the conveying device and thereby delimits at least one of the receiving spaces thereof. In the transport position, the guide element is at a smaller maximum distance from the conveyor belt surface, in particular to reduce the total width of the harvesting machine. When using elastic pocket modules, it is therefore possible to enlarge the receiving spaces during operation of the harvesting machine beyond a transport harvesting machine width which is the maximum permitted for road travel. Consequently, the harvesting machine can be easily adapted to different operating situations. In this way, a greater conveying capacity of the conveying device and therefore of the harvesting machine is facilitated in the guide position. In particular, the guide element is transferred by a pivoting movement about a pivot axis parallel to the conveyor belt surface into the transport position. This kind of transfer is particularly simple and therefore reliable.

In an advantageous embodiment of the invention, the harvesting machine has a safety device limiting the maximum distance of the pocket module from the conveyor belt surface and therefore also from the tie in a safety position. This safety device prevents an excessively large width of the elastic pocket module which can be achieved with maximum stretch of the receiving spaces in the filled state, particularly when driving the harvesting machine on the road. In particular, the pocket modules are fixed for transportation for this purpose. In this way, an increased conveying capacity of the conveying device is in turn facilitated, on the one hand, when operating the harvesting machine and, on the other hand, there is a possibility of driving the harvesting machine on the road, which broadens the scope of application and therefore improves the performance of the harvesting machine. Particularly preferably, the guide element is part of the safety device, as a result of which building space is saved and an increased conveying capacity of the harvesting machine is therefore made possible.

BRIEF DESCRIPTION OF THE DRAWINGS

Further details and advantages of the invention can be inferred from the schematically depicted exemplary embodiments described below; in the drawings.

DETAILED DESCRIPTION

The features of the exemplary embodiments according to the invention explained below may also be the subject matter of the invention individually or in combinations other than those depicted or described, but always at least in combination with the features of one of the independent claims. Insofar as it is feasible, parts which are functionally identical are provided with the same reference numbers.

Figure 1:
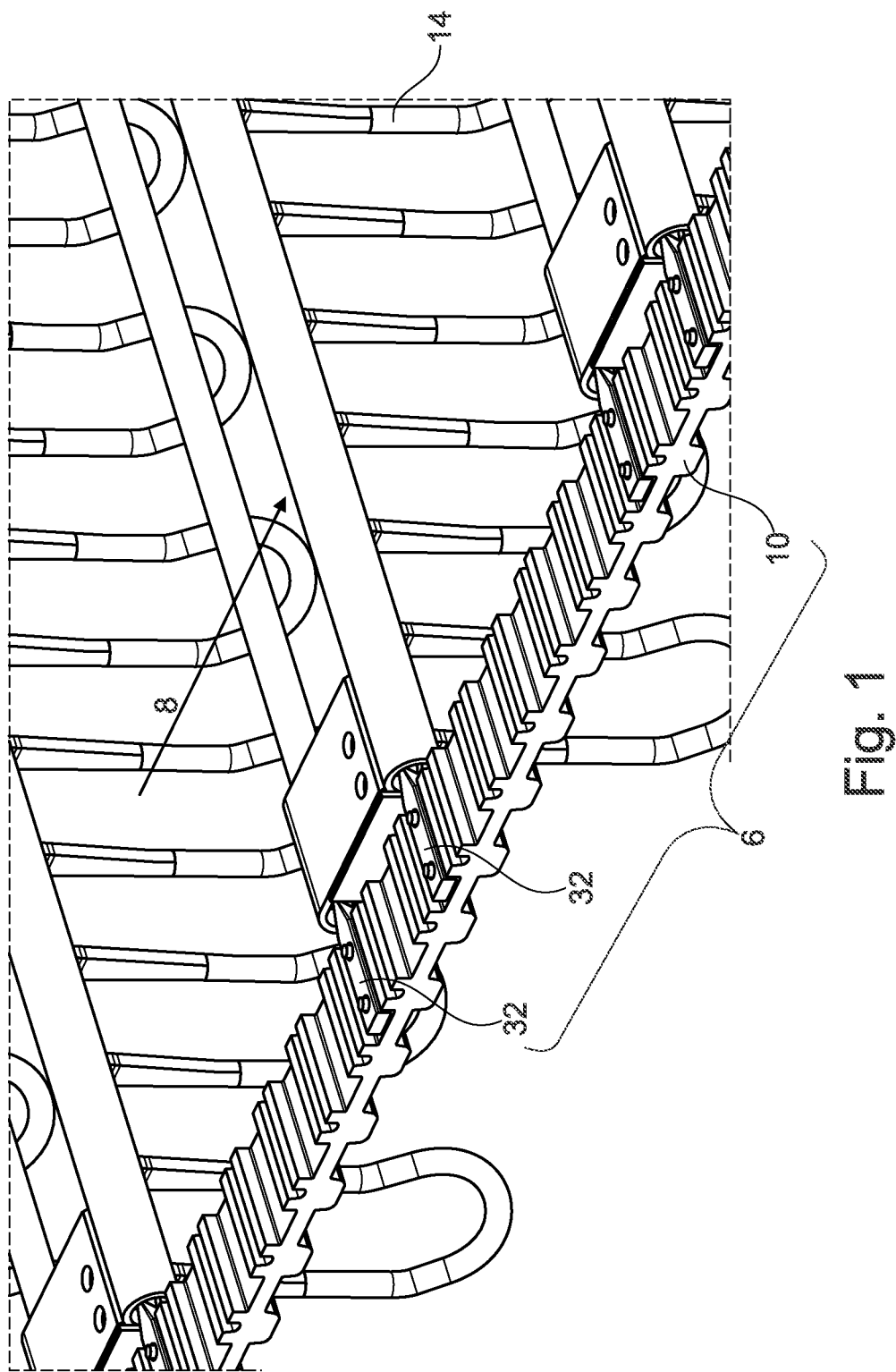
FIG. 1 shows a portion of a conveying device without a pocket module depicted as an overview.
Figure 2:
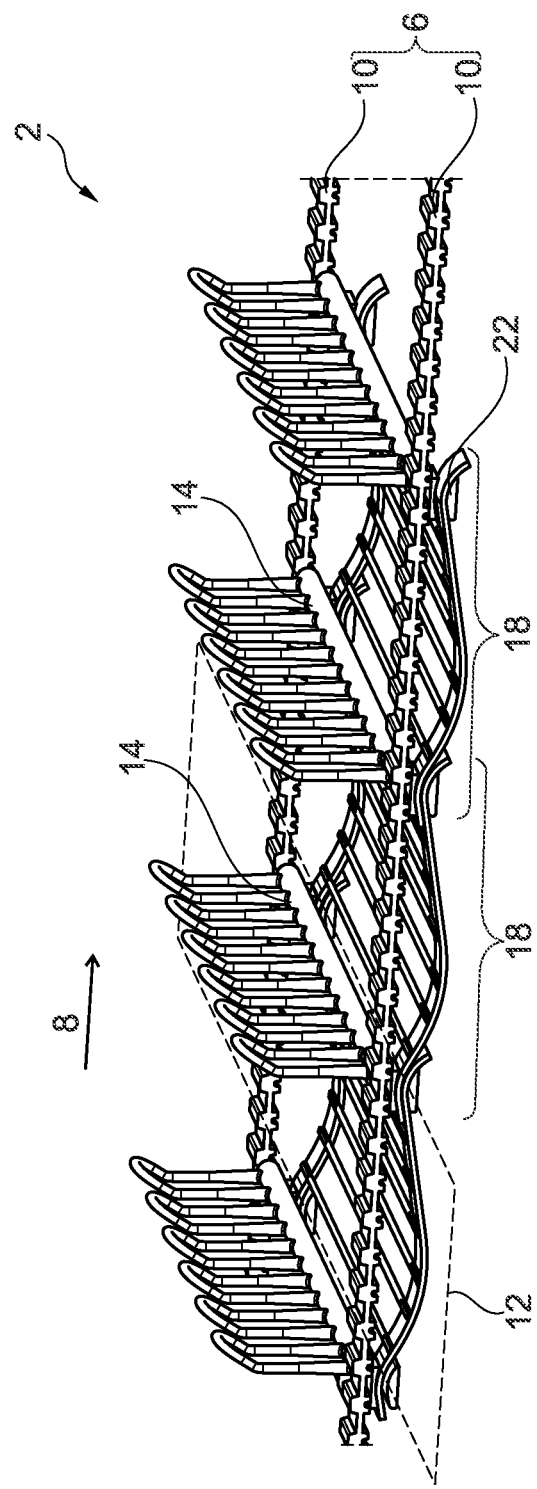
FIG. 2 shows a portion of a first exemplary embodiment of a conveying device according to the invention depicted as an overview.
Figure 3:
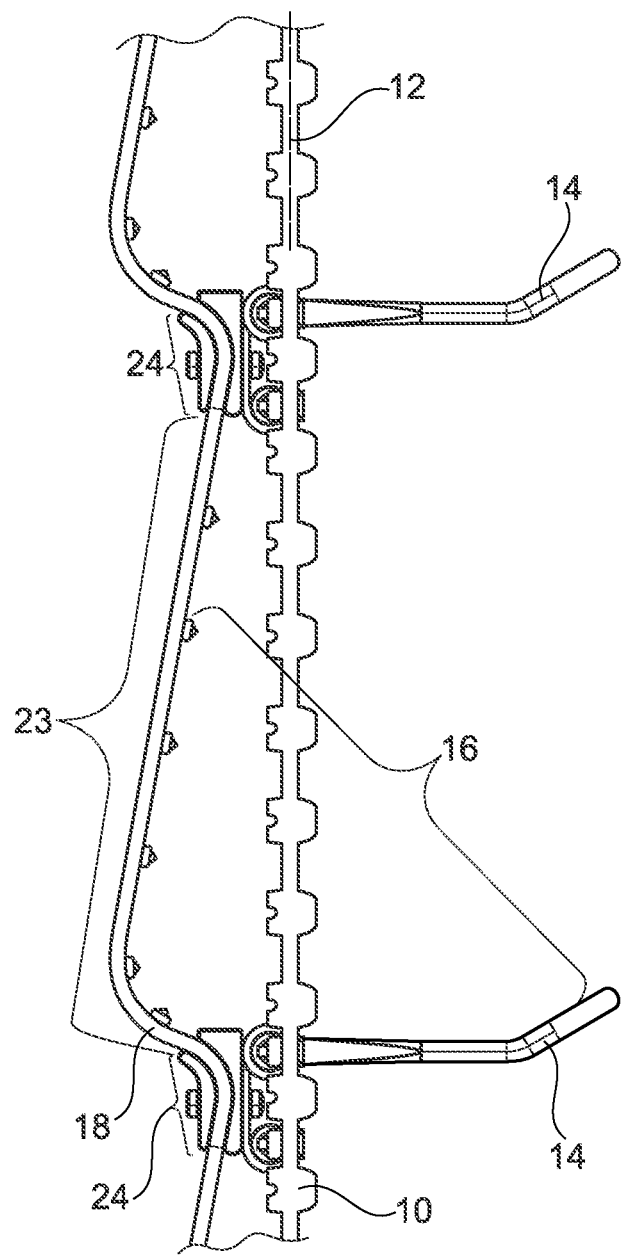
FIG. 3 shows a portion of a second exemplary embodiment of the conveying device according to the invention in side view.
Figure 6:
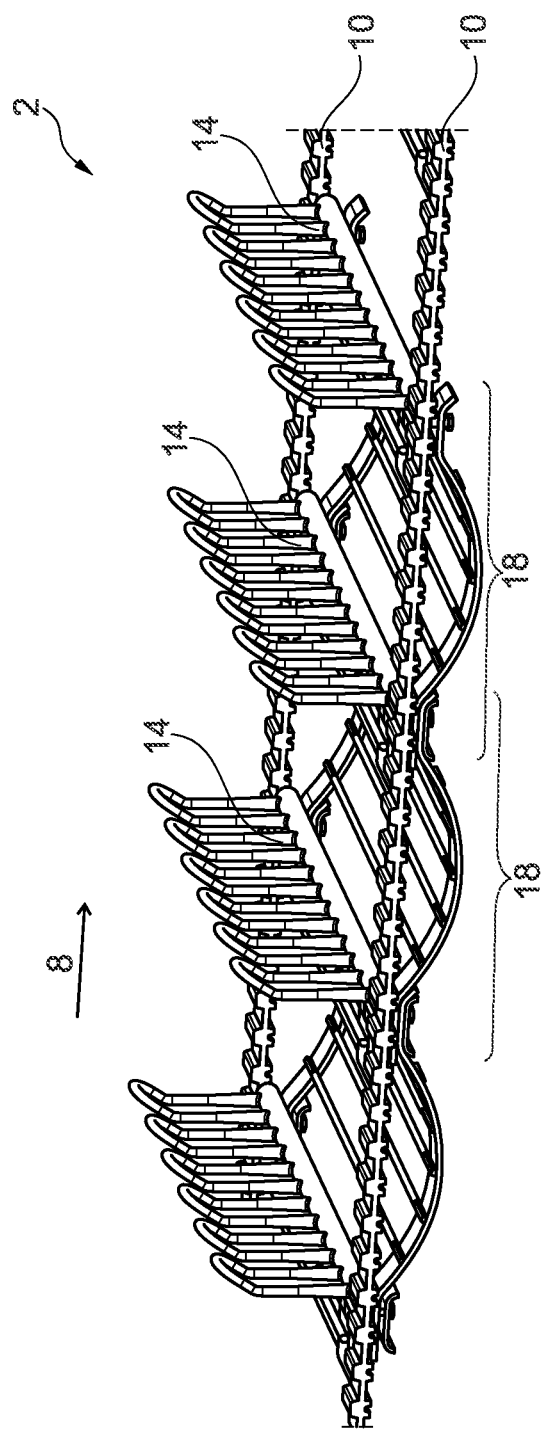
FIG. 6 shows a portion of a third exemplary embodiment of the conveying device according to the invention depicted as an overview.
Figure 7:
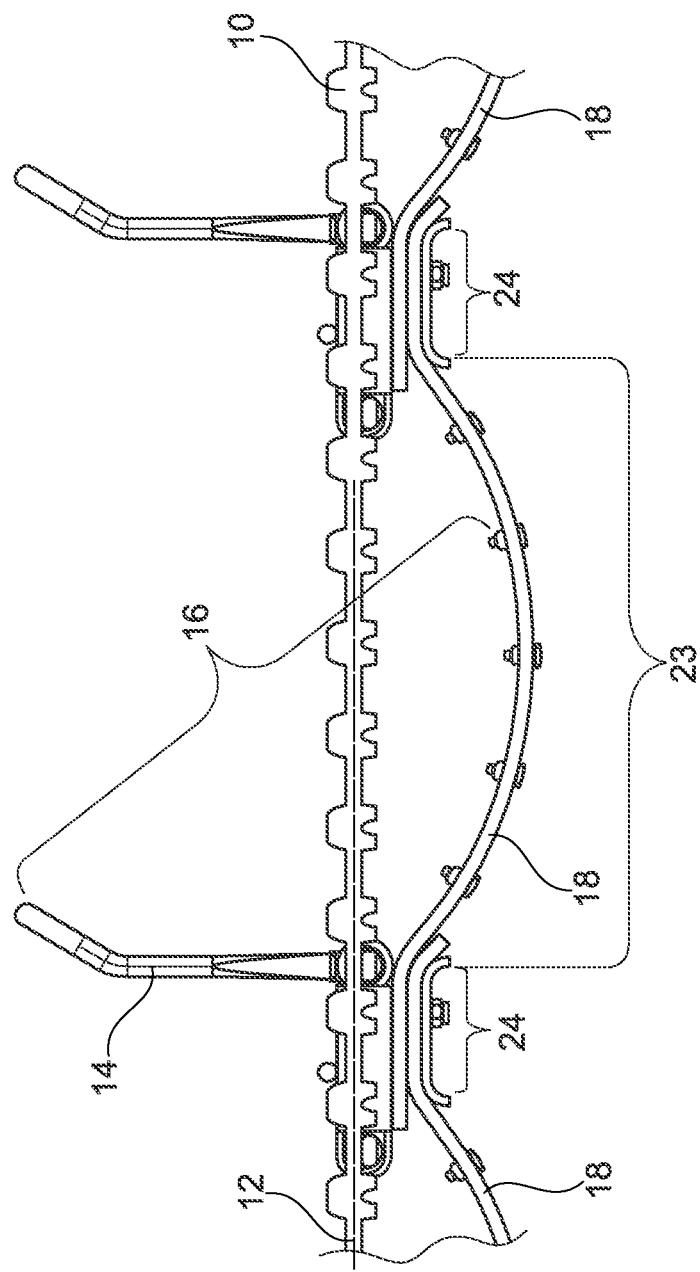
FIG. 7 shows a portion of a fourth exemplary embodiment of the conveying device according to the invention in side view.
Figure 10:
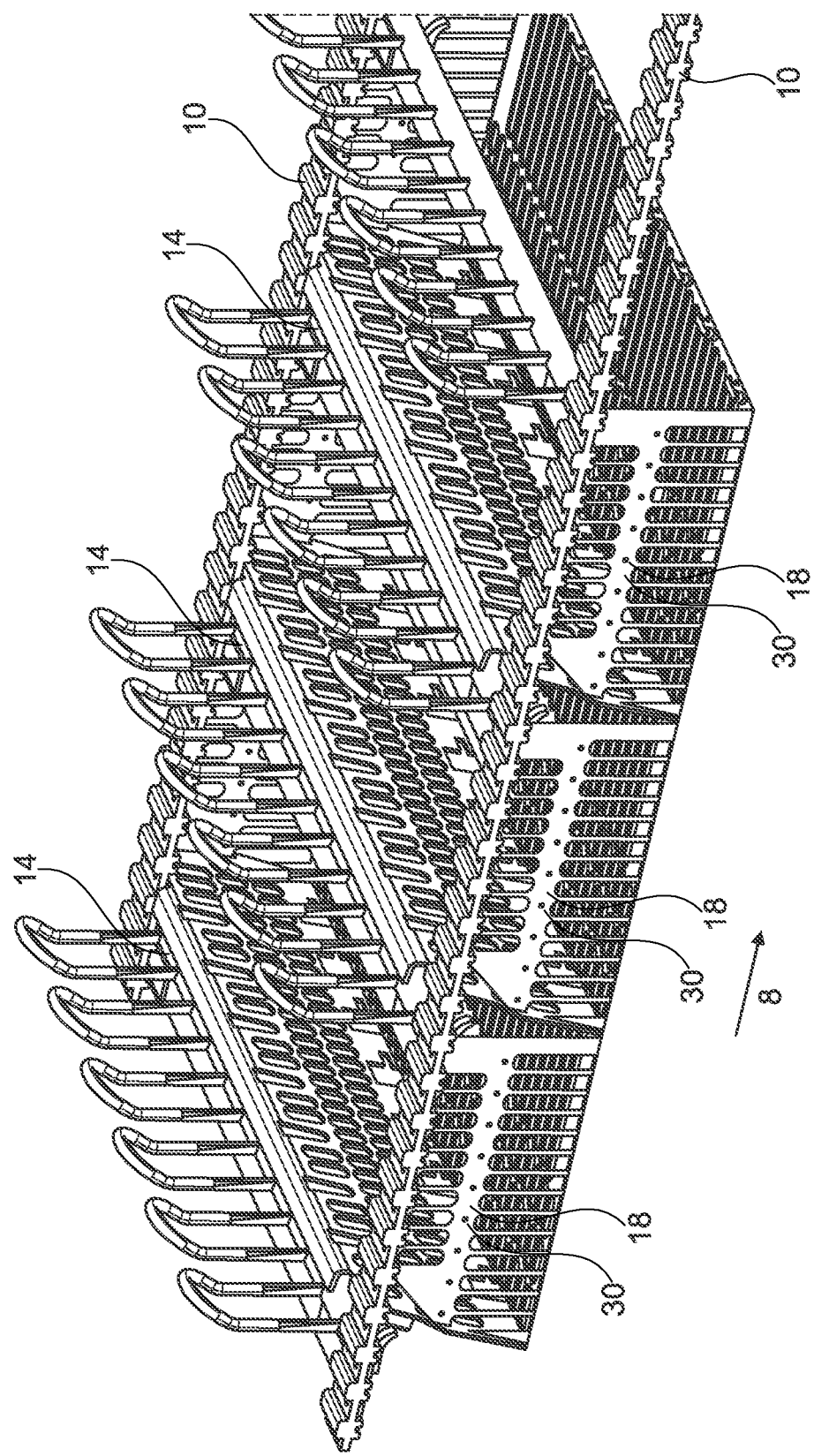
FIG. 10 shows a portion of a fifth exemplary embodiment of the conveying device according to the invention depicted as an overview.
Figure 11:
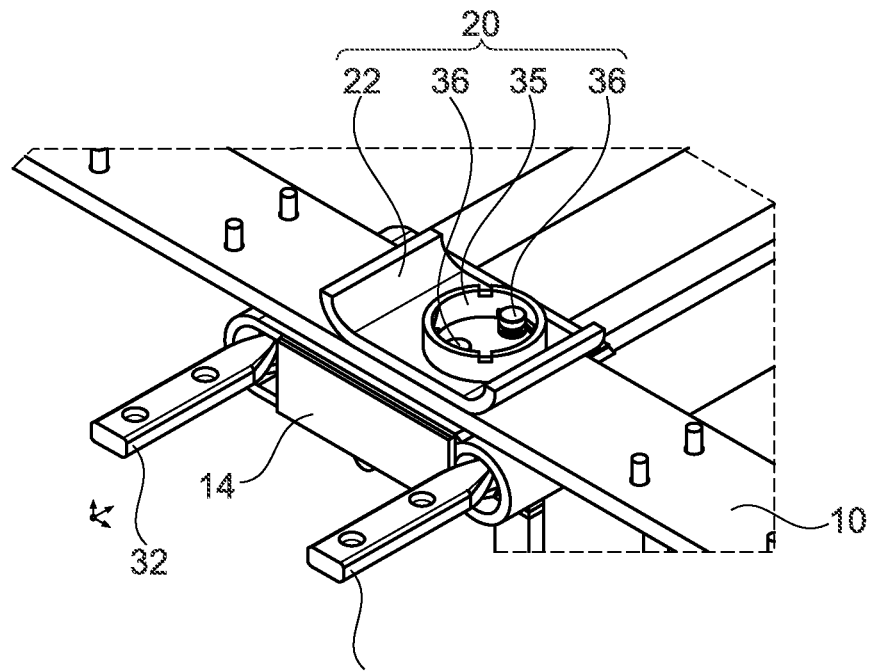
FIG. 11 shows a third exemplary embodiment of the fastening device in the conveying device according to the invention depicted as an overview.

FIGS. 2, 6 and 10 show portions of different exemplary embodiments of conveying devices 2 according to the invention. These are each used for an upwardly oriented, in particular vertical, conveyance of turnips 4 or similar root crops in harvesting machines. The conveying device 2 comprises a conveyor belt 6 with belts which, by definition, are divided into a plurality of lateral conveyor belt portions 10 following one another which are moved in a conveying direction 8 during operation. The conveyor belt 6 is therefore formed from a plurality of conveyor belt portions 10 following one another in the direction of rotation. Furthermore, strut elements 32 which are depicted in FIG. 1 are each part of the conveyor belt 6. FIG. 1 shows part of a conveying device 2 without a pocket module 18 and therefore according to the prior art.

Connecting strut elements 32 are arranged on both conveyor belt portions 10. Between them, the conveyor belt portions 10 define a particularly planar conveyor belt surface 12, the arrangement of which is indicated in FIG. 2. The conveying device 2 comprises a plurality of carrier units 14 projecting from the conveyor belt surface 12 on one side and supported on the conveyor belt 6 (cf. FIGS. 1 to 10). The carrier units 14 each delimit a receiving space 16 which extends on both sides of the conveyor belt surface 12 (cf. FIGS. 3, 4, 7, 8).

The part of the receiving space 16 which is arranged on the side of the conveyor belt surface 12 opposite the carrier unit 14 is formed by at least one detachably fastened pocket module 18. During the upwardly oriented conveyance, the turnips 4 are located in this receiving space 16 (cf. FIGS. 4 and 8).

The embodiments according to FIGS. 2, 6 and 10 each show three pocket modules 18 adjacent to one another in the conveying direction 8. Each of these pocket modules 18 forms exactly one receiving space 16. The alternative embodiments according to FIGS. 3, 4, 7 and 8 each show a pocket module 18 which co-forms a plurality of receiving spaces 16.

FIGS. 5, 9, 11 and 12 show different embodiments of fastening devices 20 by means of which the pocket module 18 is fixed in a clamping manner in respect of the carrier unit 14. FIG. 2 shows fastening devices 20 which are detachably fixed to the carrier unit 14 by two pocket modules 18 which are each connected to one another in the conveying direction 8. The pocket modules 18 in this case are each fixed by the fastening units 20 exclusively to the carrier units 14.

Each of the pocket modules 18 shown in FIGS. 2 and 6 has four fastening regions 24 which are adjacent to a fastening device 20 in each case. Two fastening devices 20 are each arranged spaced apart from one another laterally on a carrier unit 14.

Figure 5:
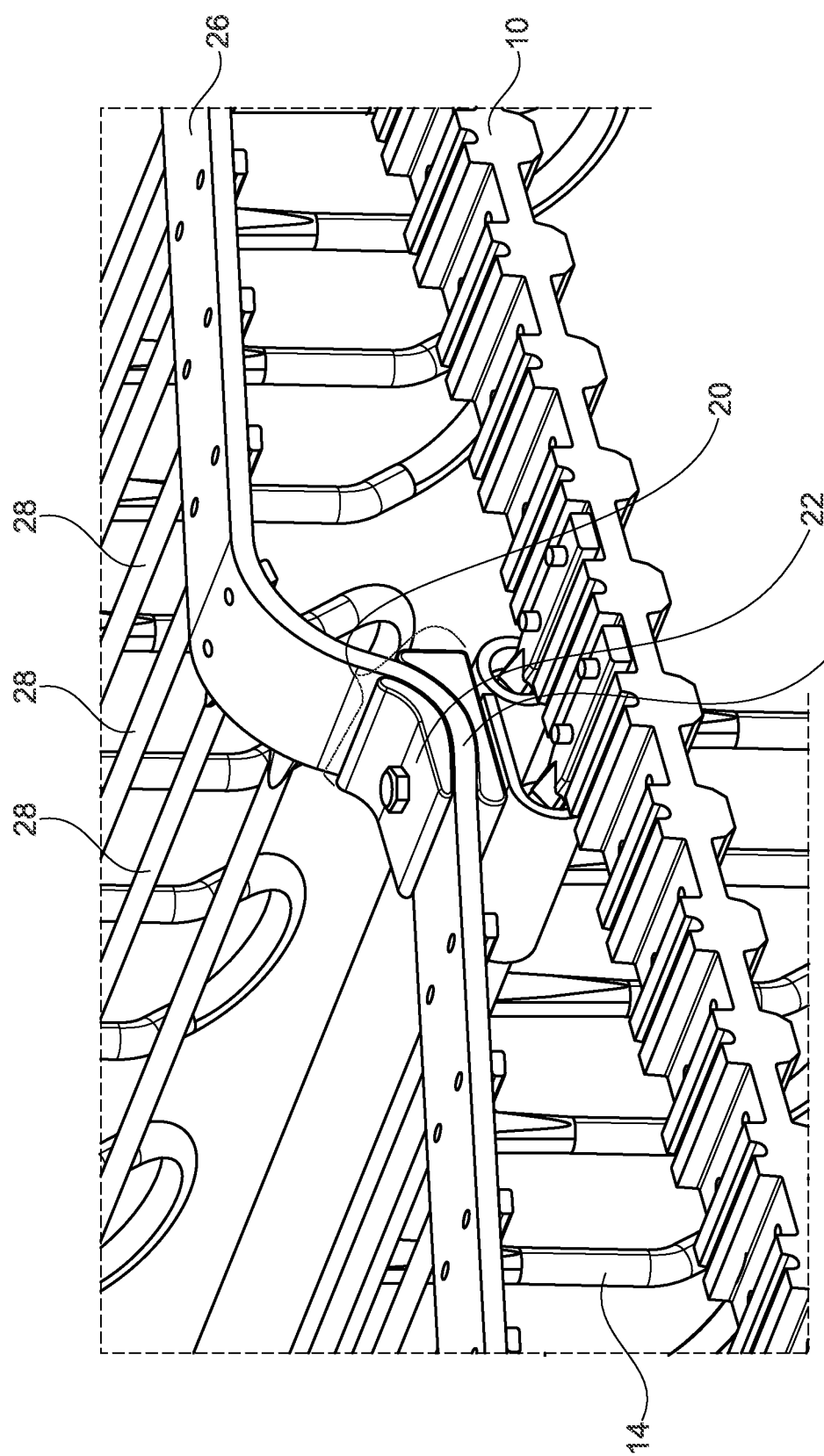
FIG. 5 shows a first exemplary embodiment of a fastening device of the conveying device according to the invention depicted as an overview.
Figure 8:
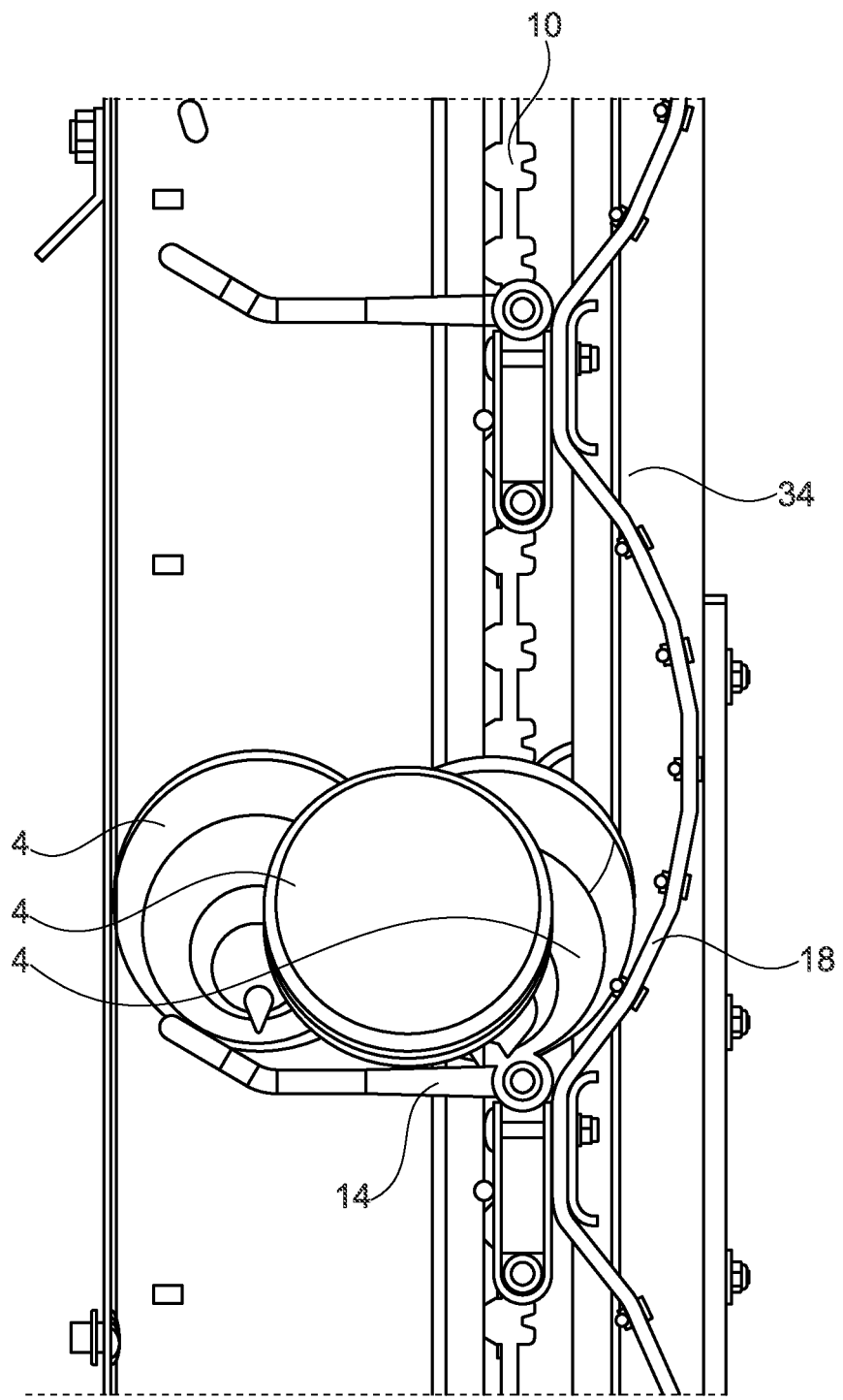
FIG. 8 shows the portion of the fourth exemplary embodiment of the conveying device according to the invention in FIG. 7 in the harvesting machine with turnips in a mirrored side depiction.
Figure 9:
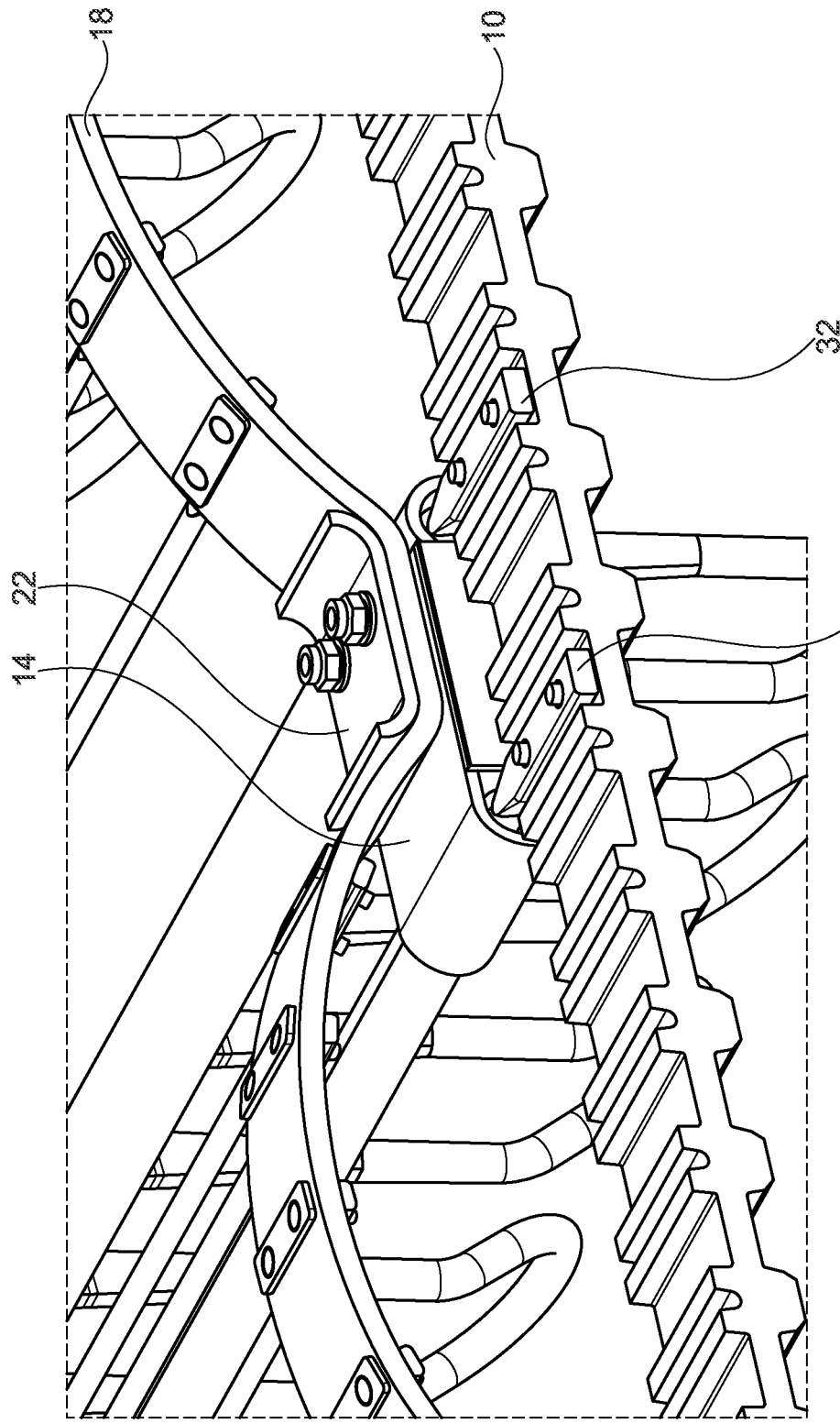
FIG. 9 shows a second exemplary embodiment of the fastening device of the conveying device according to the invention depicted as an overview.

The fastening devices 20 comprise at least one form element 22 adjacent to a pocket module 18 which simulates a shape of the receiving space 16 (cf. FIGS. 5 and 9). These fastening devices influence the shape of the pocket module 18 adjacent to them in order to achieve an optimum embodiment of the receiving space 16. The form elements 22 produce a cross section of the receiving space 16 which in the embodiment according to FIG. 3 adopts the shape of a halved droplet. By contrast, the form elements 22 depicted in FIGS. 7 to 9 produce a mirror-symmetrical shape of the portion of the pocket module 18 arranged between them.

The fastening devices 20 according to FIGS. 2 and 6 each fix two pocket modules 18 which are connected to one another and overlap one another in a clamping manner and in respect of the carrier unit 14.

The exemplary embodiments according to FIGS. 2 to 9 each have at least one pocket module 18 with at least two fastening regions 24 which are adjacent in the conveying direction 8 and each adjoin a fastening device 20. The distance of the fastening regions 24 in this case is smaller than the length 23 of the pocket module 18 between the fastening regions 24 in an unrolled state (cf. FIGS. 3 and 7). The fact that the length of the pocket module 18 between the fastening regions 24, in a state in which the pocket module 18 extends in a straight line, is longer than the distance between two adjacent fastening regions 24 in the mounted state, means that pocket-shaped regions of the receiving space 16 are produced.

Figure 4:
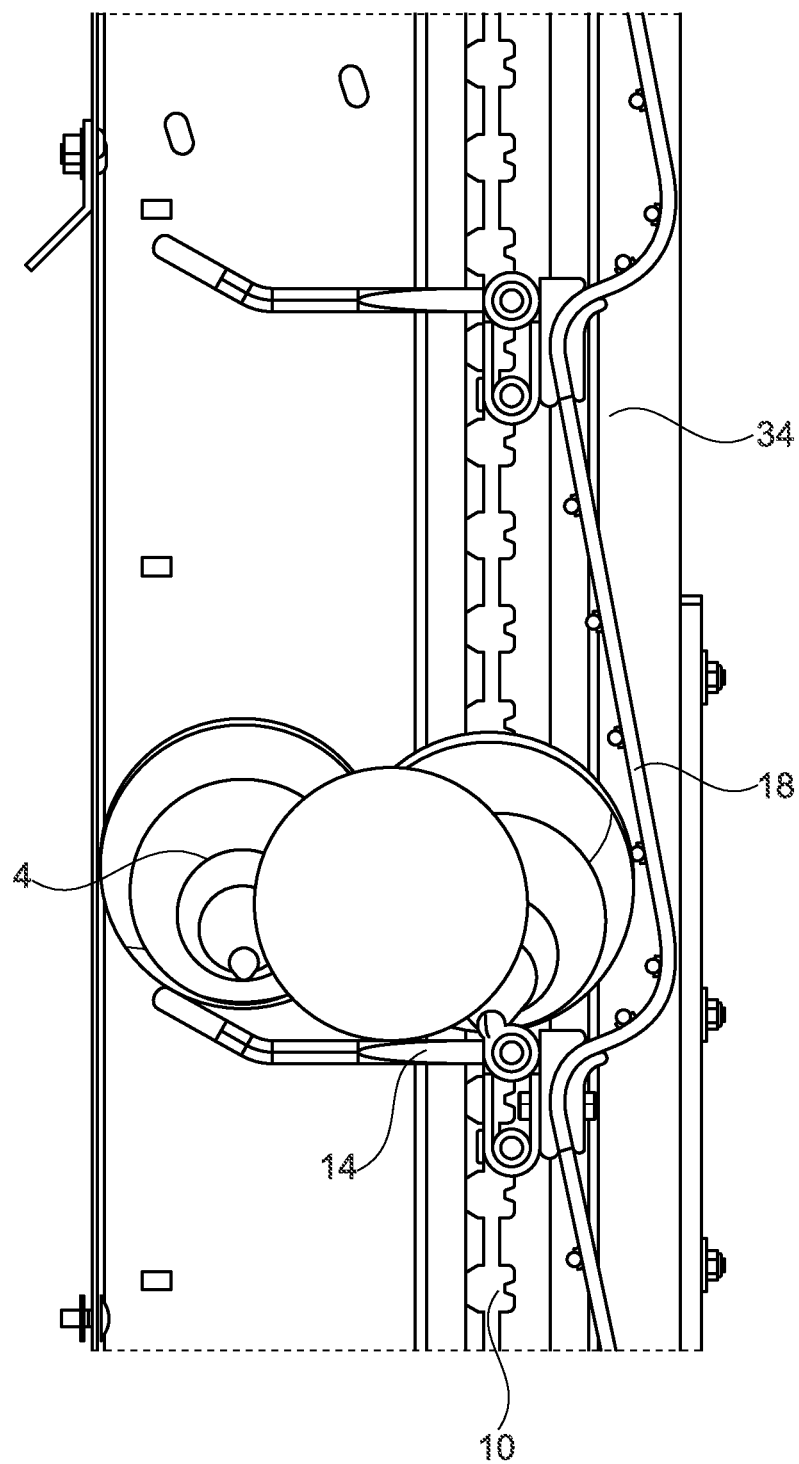
FIG. 4 shows the portion of the second exemplary embodiment of the conveying device according to the invention in FIG. 3 in a harvesting machine with turnips as a mirrored side view.

The pocket modules 18 shown in FIGS. 2 and 6 each have two pocket ties 26 arranged parallel to one another. These are each connected to one another by a plurality of metallic wall elements 28. These wall elements 28 are equidistant and arranged extending transversely to the conveying direction 8 at the pocket ties 26. In the embodiment of the conveying device 2 according to the invention shown in FIG. 10, the pocket modules 18 are formed as dimensionally stable baskets 30. These baskets 30 are integrally formed. Two strut elements 32 arranged on the conveyor belt 6 in each case are assigned to a carrier unit 14 which encloses said strut elements 32 between the conveyor belt portions 10 (cf. FIG. 1). The strut elements 32 are arranged in pairs and extend transversely to the conveying direction 8 on the conveyor belt portions 10. FIGS. 4 and 8 each show a portion of a conveying device 2 installed in a harvesting machine during operation with turnips 4. The harvesting machine comprises a guide element 34 which extends at least in the conveying direction 8 and does not move in the conveying direction 8. The receiving spaces 16 are closed by this guide element 34 in a lateral region adjoining the conveyor belt portions 10. The guide element 34 in this case can be transferred from a depicted guide position into a transport position.

Figure 12:
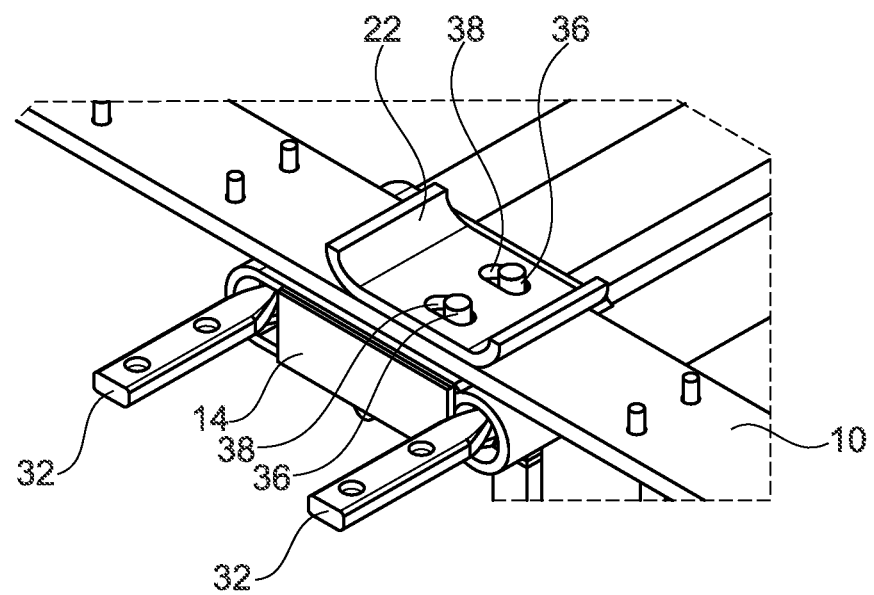
FIG. 12 shows a fourth exemplary embodiment of the fastening device of the conveying device according to the invention depicted as an overview.

The fastening devices 20 according to FIGS. 5 and 9 must each be fixed by at least one screw on the carrier unit 14. The fastening device 20 according to FIG. 11 fixes the pocket module 18 in turn with the form element 22 in a clamping manner to the carrier unit 14, wherein the form element 22 is fixed by a clamping ring 35 to a nonrotating thread turn on two fastening heads 36 fixed on the carrier unit 14 in a stationary manner. FIG. 12 shows a form element 22 with two recesses 38 which in turn engage beneath a fastening head 36 and therefore fix the pocket module 18 in a clamping manner.

Figure 13:
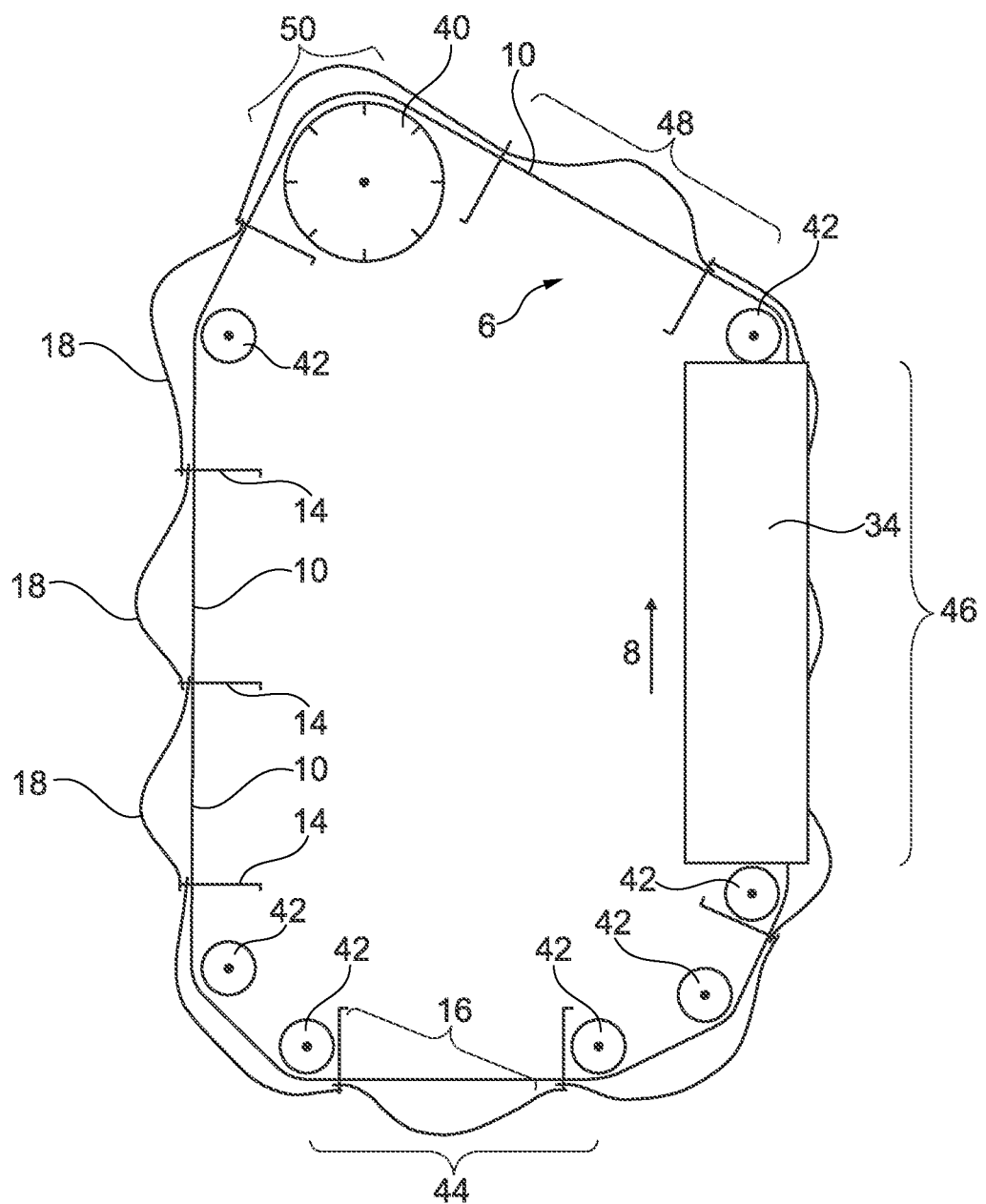
FIG. 13 shows the conveying device according to the invention as a schematic side depiction.

FIG. 13 is a schematic representation of a conveying device according to the invention with a drive element 40 and deflection elements 42 and also an alternative embodiment of the guide element 34 in the lower, partially horizontally running receiving part 44 of the conveying device 2, the root crops are fed into the receiving spaces 16 during rotation, in this case the part of the receiving spaces 16 lying below the conveyor belt portion 10 shown is delimited on the outside of the conveying device 2 by pocket modules 18. The conveyor belt 6 rotating in an anti-clockwise manner is enclosed by a guide element 34 which is Li-shaped in cross section in a vertical part 46 following the receiving part 44 in the conveying direction 8 and co-forms the receiving spaces 16 arranged in the vertical part 46. In the vertical part 46, the guide element 34 delimits the receiving spaces 16 on their side facing away from the pocket module 18 and also laterally, i.e. parallel to the image plane. The vertical part 46 is followed in the conveying direction by a delivery part 48 of the conveying device 2, in that the root crops 4 are ejected from the receiving spaces 16. In a drive part 50 following the delivery part 48, the conveyor belt 6 rests against a drive element 40 which applies the force necessary for rotation to the conveyor belt 6.

Figure 14:
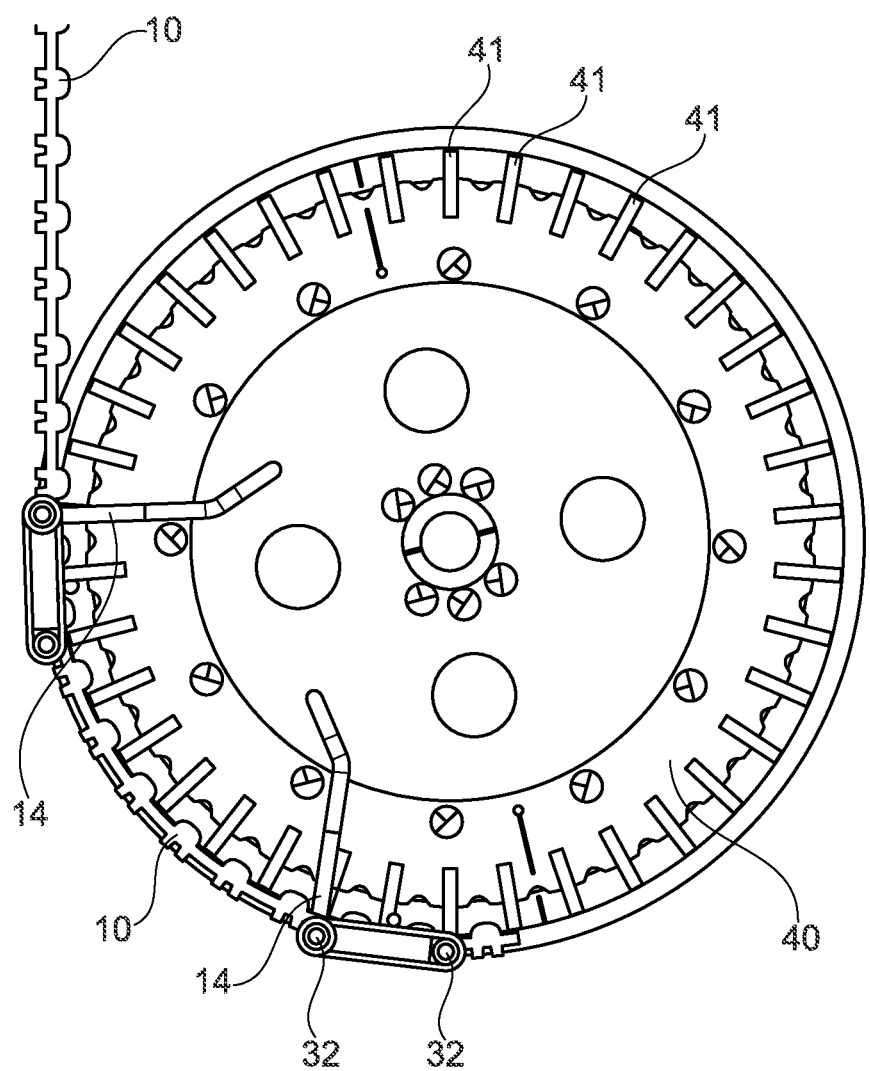
FIG. 14 shows a drive element of a conveying device according to the invention with a portion of the conveying device without a pocket module in side view.

FIG. 14 shows in a viewing direction from the centre of the conveyor belt 6 how the drive element 40 partially engages with drive teeth 41 in the conveyor belt portion 10 shown and forms a form-fitting connection. The carrier units 14 shown lie on the inside of the drive element 40 in this case. FIG. 14 only shows part of the circulating, continuous belt conveyor belt portions 10.

The invention claimed is:

1. A conveying device for an upwardly oriented conveyance of turnips or other root crops in harvesting machines, the conveying device comprising:
   a conveyor belt with at least two lateral conveyor belt portions positioned to move in a conveying direction during operation, the conveyor belt portions between them defining a planar virtual conveyor belt surface, and
   at least one carrier unit which projects from the virtual conveyor belt surface on one side and is supported by the conveyor belt, which carrier unit delimits a receiving space extending on both sides of the virtual conveyor belt surface, wherein a part of the receiving space is arranged on a side of the virtual conveyor belt surface which is opposite the carrier unit is formed by at least one detachably fastened pocket module;

wherein the pocket module has two pocket ties arranged in parallel which are connected to one another by at least one metallic or plastic wall element;

wherein the pocket module comprises a plurality of wall elements which are configured as struts which run transversely to the conveying direction;

wherein the pocket module does not intersect with the virtual conveyor belt surface and is detachable from the conveyor belt during dismantling in a direction facing away from the virtual conveyor belt surface; and the conveyor belt portions define the virtual conveyor belt surface insofar as it extends at least transversely to the conveying direction in a straight line through both conveyor belt portions, the virtual conveyor belt surface extending in the conveying direction of the conveying device.

2. The conveying device according to claim 1, further comprising at least two pocket modules connected to one another in the conveying direction.

3. The conveying device according to claim 2, wherein the two pocket modules which are connected to one another in the conveying direction are each detachably fixed by at least one fastening device.

4. The conveying device according to claim 3, wherein the fastening device comprises at least one form element which simulates a shape of the receiving portion and is adjacent to the pocket module.

5. The conveying device according to claim 3, wherein the fastening device fixes two pocket modules which are connected to one another in a clamping manner with the carrier unit.

6. The conveying device according to claim 3, wherein the pocket module has at least two fastening regions which are adjacent in the conveying direction and each adjoin a fastening device, a distance between the at least two fastening regions being smaller than the length of the pocket module between the fastening regions in an unrolled state.

7. The conveying device according to claim 1, wherein each of said at least one pocket module is arranged forming at most six receiving spaces.

8. The conveying device according to claim 1, wherein each of said at least one pocket module is arranged forming exactly one receiving space.

9. The conveying device according to claim 1, wherein the pocket module is fixed at least in the region of the carrier unit by at least one fastening device.

10. The conveying device according to claim 1, wherein the pocket module is fixed exclusively in the region of the carrier unit by at least one fastening device.

11. The conveying device according to claim 1, wherein the pocket module is fixed at least in the region of a further carrier unit which is adjacent in the conveying direction or between the region of the carrier unit and the region of the further carrier unit by at least one fastening device.

12. The conveying device of claim 1, wherein the plurality of wall elements are equidistant.

13. The conveying device according to claim 1, wherein the pocket module is configured as a dimensionally stable basket.

14. The conveying device according to claim 1, wherein the pocket module is made of plastic.

15. The conveying device according to claim 1, wherein the pocket module is integrally formed with the carrier unit.

16. The conveying device according to claim 1, wherein the conveyor belt comprises at least two strut elements arranged on the conveyor belt portions and assigned to the carrier unit.

17. A harvesting machine for turnips or other root crops, the harvesting machine comprising a conveying device according to claim 1.

18. The harvesting machine according to claim 17, wherein during operation of the conveying device, the receiving space preferably adjoins at least one guide element extending in the conveying direction and not moving in the conveying direction at least sectionally.

19. The harvesting machine according to claim 18, wherein the guide element is transferable from a guide position into a transport position.

20. The harvesting machine according to claim 17, further including a safety device limiting the maximum distance of the pocket module from the virtual conveyor belt surface in a safety position.

* * * * *

UNITED STATES PATENT AND TRADEMARK OFFICE
CERTIFICATE OF CORRECTION

| | |
|---|---|
| PATENT NO. | : 11,483,966 B2 |
| APPLICATION NO. | : 16/757494 |
| DATED | : November 1, 2022 |
| INVENTOR(S) | : Jörg Landsberg et al. |

It is certified that error appears in the above-identified patent and that said Letters Patent is hereby corrected as shown below:

In the Specification

In Column 4, Line 53, delete "$\Delta t$" and replace with -- at --

Signed and Sealed this
Eighteenth Day of June, 2024

Katherine Kelly Vidal
*Director of the United States Patent and Trademark Office*